(12) United States Patent
Chun

(10) Patent No.: US 11,696,126 B2
(45) Date of Patent: Jul. 4, 2023

(54) VEHICLE HAVING CONNECTED CAR SERVICE AND METHOD OF CONTROLLING THE SAME

(71) Applicants: HYUNDAI MOTOR COMPANY, Seoul (KR); KIA MOTORS CORPORATION, Seoul (KR)

(72) Inventor: Chang Woo Chun, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 1079 days.

(21) Appl. No.: 16/291,131

(22) Filed: Mar. 4, 2019

(65) Prior Publication Data
US 2020/0154273 A1    May 14, 2020

(30) Foreign Application Priority Data
Nov. 14, 2018    (KR) .................. 10-2018-0139724

(51) Int. Cl.
  G06F 21/31    (2013.01)
  H04W 12/06   (2021.01)
(52) U.S. Cl.
  CPC ............ *H04W 12/06* (2013.01); *G06F 21/31* (2013.01); *G06F 2221/2113* (2013.01)
(58) Field of Classification Search
  CPC ........ H04W 12/06; H04W 4/48; H04L 63/08; H04L 63/105; H04L 63/083; H04L 63/0838; H04L 63/0861; H04L 63/0876; H04L 67/12; G06F 21/31; G06F 2221/2113

USPC .......................................................... 701/36
See application file for complete search history.

(56) References Cited

U.S. PATENT DOCUMENTS

| | | | |
|---|---|---|---|
| 9,348,492 B1* | 5/2016 | Penilla | H04L 63/083 |
| 9,868,449 B1* | 1/2018 | Holz | G06V 40/10 |
| 10,075,581 B2* | 9/2018 | Cohen | H04W 4/027 |
| 10,367,934 B2* | 7/2019 | Villaume | H04M 1/72454 |
| 2003/0222758 A1* | 12/2003 | Willats | B60R 25/04 |
| | | | 340/5.72 |
| 2014/0222298 A1* | 8/2014 | Gurin | G06Q 10/08 |
| | | | 701/49 |

(Continued)

FOREIGN PATENT DOCUMENTS

| | | |
|---|---|---|
| CN | 105346502 A | 2/2016 |
| CN | 106652124 A | 5/2017 |
| CN | 107521435 A | 12/2017 |

OTHER PUBLICATIONS

Combined Authentication-Based Multilevel Access Control in Mobile Application for DailyLifeService; Park et al., Jun. 2010 (Year: 2010).*

(Continued)

*Primary Examiner* — Jahangir Kabir
(74) *Attorney, Agent, or Firm* — Morgan, Lewis & Bockius LLP

(57) ABSTRACT

A vehicle includes: a plurality of seats; an authentication executing processor configured to perform authentication on a user; and a controller configured to provide a connected car service based on whether the authentication is completed, wherein the controller controls the authentication executing processor to distinguish a seat on which the user sits and to perform the authentication based on the distinguished seat.

18 Claims, 10 Drawing Sheets

| CLASSIFICATION OF CONNECTED CAR SERVICES | CONTENTS | SECURITY INTENSITY | AUTHENTICATION METHOD |
|---|---|---|---|
| ACCOUNT CREATION | SERVICE SUBSCRIPTION, VEHICLE REGISTRATION | TOP | PERSONAL IDENTITY CHECK |
| VEHICLE CONTROL | DRIVING, REMOTE CONTROL, FAULT DIAGNOSIS, AUTOMATIC ACCIDENT NOTIFICATION, SOS | HIGH | CONFIRM PERSONAL ACCOUNT |
| FIRST PERSONALIZATION SERVICE | SERVICES REQUIRING LOGIN TO PERSONAL ACCOUNT | MEDIUM | SERVICE USAGE CHECK |
| SECOND PERSONALIZATION SERVICE | VEHICLE CONTENTS PERSONAL SERVICE | LOW | OCCUPANCY STATUS CHECK |
| REAL-TIME INFORMATION SERVICE | WEATHER, NEWS, TRAFFIC INFORMATION | LOW | OCCUPANCY STATUS CHECK |

(56) References Cited

U.S. PATENT DOCUMENTS

| | | | |
|---|---|---|---|
| 2014/0298431 A1 | 10/2014 | Kim et al. | |
| 2014/0309806 A1 | 10/2014 | Ricci | |
| 2016/0075233 A1* | 3/2016 | Chun | B60K 35/00 |
| | | | 701/36 |
| 2021/0021999 A1* | 1/2021 | Ramie | H04W 4/40 |

OTHER PUBLICATIONS

First Office Action issued in corresponding Chinese Patent Application No. 2019102285357, dated Aug. 25, 2022.

* cited by examiner

FIG. 3

| CLASSIFICATION OF CONNECTED CAR SERVICES | CONTENTS | SECURITY INTENSITY | AUTHENTICATION METHOD |
|---|---|---|---|
| ACCOUNT CREATION | SERVICE SUBSCRIPTION, VEHICLE REGISTRATION | TOP | PERSONAL IDENTITY CHECK |
| VEHICLE CONTROL | DRIVING, REMOTE CONTROL, FAULT DIAGNOSIS, AUTOMATIC ACCIDENT NOTIFICATION, SOS | HIGH | CONFIRM PERSONAL ACCOUNT |
| FIRST PERSONALIZATION SERVICE | SERVICES REQUIRING LOGIN TO PERSONAL ACCOUNT | MEDIUM | SERVICE USAGE CHECK |
| SECOND PERSONALIZATION SERVICE | VEHICLE CONTENTS PERSONAL SERVICE | LOW | OCCUPANCY STATUS CHECK |
| REAL-TIME INFORMATION SERVICE | WEATHER, NEWS, TRAFFIC INFORMATION | LOW | OCCUPANCY STATUS CHECK |

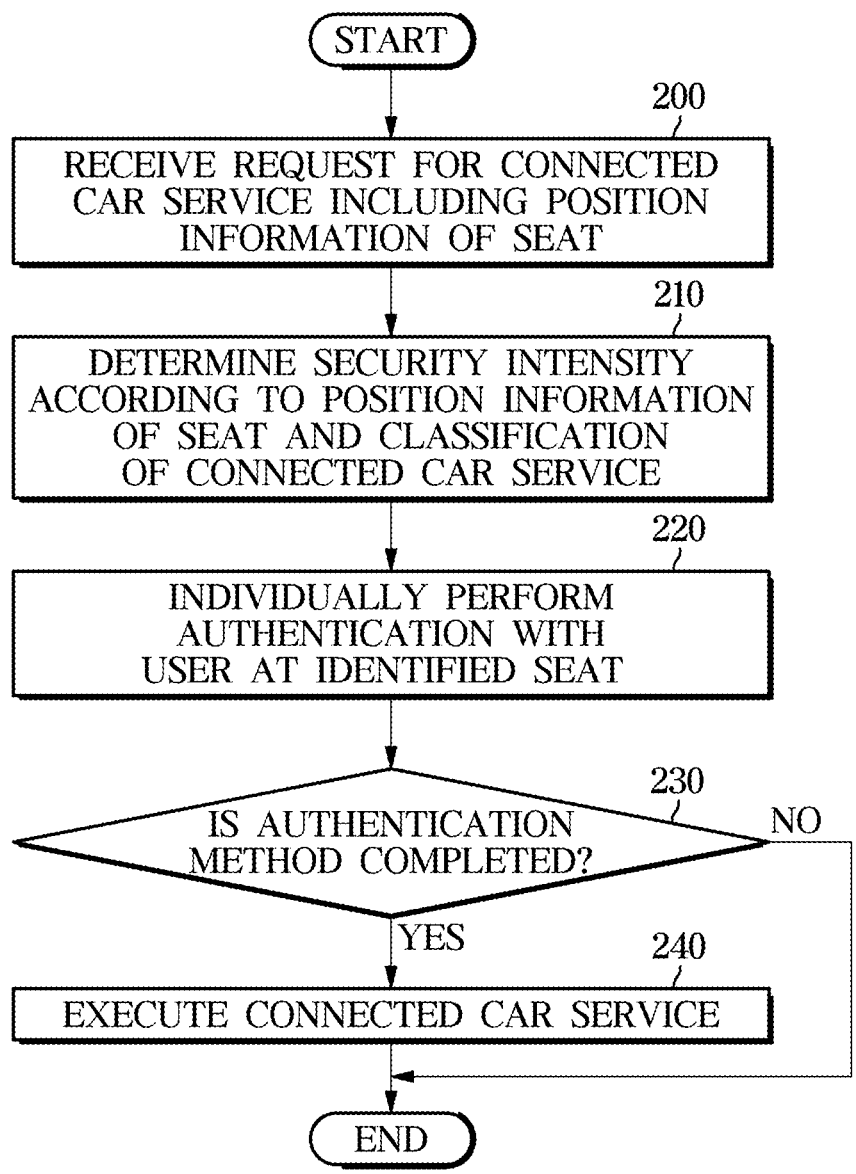

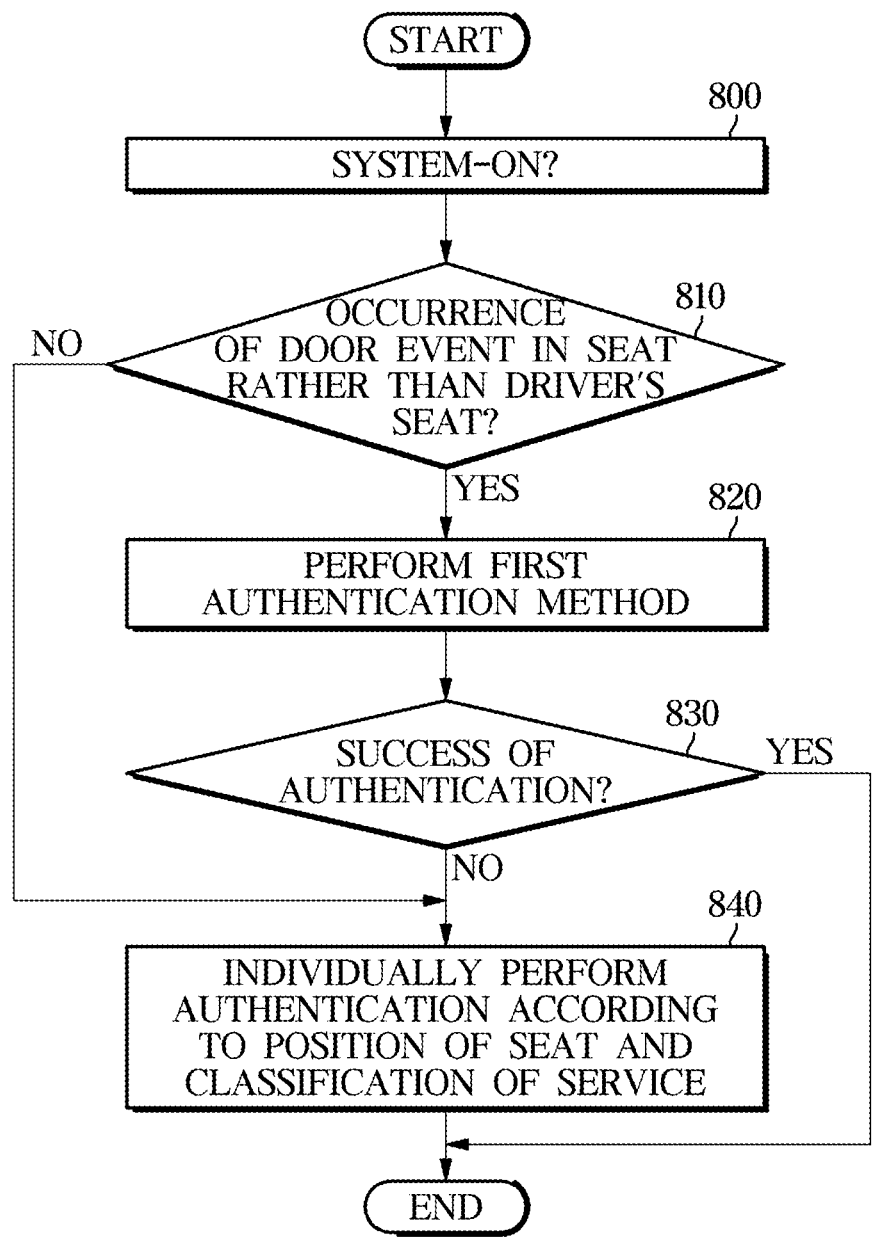

VEHICLE HAVING CONNECTED CAR SERVICE AND METHOD OF CONTROLLING THE SAME

CROSS-REFERENCE TO RELATED APPLICATION

This application is based on and claims priority to Korean Patent Application No. 10-2018-0139724, filed on Nov. 14, 2018 in the Korean Intellectual Property Office, the disclosure of which is incorporated herein by reference.

TECHNICAL FIELD

The present disclosure relates to a vehicle for executing a connected car service by distinguishing seats of the vehicle and a method of controlling the same.

BACKGROUND

Recently, research and development on a connected car has been increasing. A connected car refers to a vehicle equipped with information and telecommunication technology and capable of two-way internet and mobile services.

Such a connected car can be classified into an embedded-type connected car and a mirroring-type connected car. The embedded scheme refers to connecting mobile communication with a modem installed in vehicle through a user terminal, and the mirroring scheme refers to connecting an audio, video, navigation (AVN) device provided in vehicle with a user terminal through Wi-Fi.

A vehicle connected through the above-described scheme can provide a user with various types of infotainment in connection with a user terminal. Hereinafter, the various types of infotainment provided by the vehicle in connection with the user terminal is referred to as a connected car service.

On the other hand, Internet and mobile services used through a user terminal have security functions that are robust at performing such services as privacy protection and payment. However, the connected car service connected to the user terminal through the vehicle can be accessible by a simple security authentication after a driver-based authentication. In addition, even for a connected car service individually connectable at each seat, individual authentication is not performed, thus still having a vulnerability to the security.

SUMMARY

An object of the present disclosure is to provide a vehicle capable of adjusting authentication intensity suitable for a use environment of a vehicle infotainment system and improving easy of use while maintaining security intensity of user authentication by providing an authentication execution service for each seat of the vehicle, and a method of controlling the same.

Additional aspects of the present disclosure will be set forth in part in the description which follows and, in part, will be obvious from the description, or may be learned by practice of the disclosure.

According to an exemplary embodiment of the present disclosure, a vehicle includes: a plurality of seats; an authentication executing processor configured to perform authentication on a user; and a controller configured to provide a connected car service based on whether the authentication is completed, wherein the controller controls the authentication executing processor to distinguish a seat on which the user sits and to perform the authentication on the basis of the distinguished seat.

The controller may distinguish the seat on the basis of a request for the connected car service including position information of the plurality of seats and determines a level of security intensity on the basis of the distinguished seat and the requested connected car service.

The controller may check whether a first authentication method according to the level of security intensity has been performed, and perform a second authentication method which has a level of security intensity lower than the level of security intensity of the first authentication method on the basis of completion of authentication according to the first authentication method.

The controller may perform the second authentication method on the basis of whether a door event has occurred, after the completion of the authentication of the first authentication method.

The controller may perform an authentication lockout on the basis of whether the user sits on the distinguished seat, after the occurrence of door event.

The controller may perform the second authentication method on the basis of an authentication maintaining time after the completion of the authentication of the first authentication method.

The controller may determine whether to maintain an account on the basis of whether ignition-off is achieved after the completion of the authentication of the first authentication method, and perform the second authentication method on the basis of whether linking of the account is achieved.

The controller may cancel the first authentication method on the basis whether log-out is achieved after the authentication according to the first authentication method is completed.

The controller may receive information indicating a status of completion of the authentication according to the first authentication method from an outside, after a system-on command of the vehicle is received.

The controller may perform the second authentication method upon receiving an additional request for a connected car service on the basis of whether a door event or an ignition-on is achieved.

The controller may perform the second authentication method upon receiving an additional request for a connected car service on the basis of whether the user approaches to be within a predetermined range of the vehicle.

According to another exemplary embodiment of the present disclosure, a method of controlling a vehicle includes: a plurality of seats, the method including: distinguishing the plurality of seats on the basis of a request for a connected car service including position information of the plurality of seats; performing authentication on a user on the basis of the distinguished seat; and executing the connected car service on the basis of whether the authentication is completed.

The method may further include determining a level of security intensity on the basis of the distinguished seat and the requested connected car service.

The performing of the authentication may include: checking whether a first authentication method according to the level of security intensity has been performed; and performing a second authentication method which has a level of security intensity lower than a level of security intensity of the first authentication method on the basis of completion of the authentication according to the first authentication method.

The performing of the authentication may include performing the second authentication method on the basis of whether a door event has occurred after the completion of the authentication of the first authentication method.

The performing of the authentication may include an authentication lockout on the basis of whether the user sits on the distinguished seat, after the occurrence of the door event.

The performing of the authentication may include performing the second authentication method on the basis of an authentication maintaining time after the completion of the authentication of the first authentication method.

The performing of the authentication may include determining whether to maintain an account on the basis of whether ignition-off is achieved after the completion of the authentication of the first authentication method, and performing the second authentication method on the basis of whether linking of the account is achieved.

The method may further include canceling the first authentication method on the basis of whether log-out is achieved after the completion of the authentication of the first authentication method.

The method may further include receiving information indicating a status of completion of the authentication according to the first authentication method from an outside, after a system-on command of the vehicle is received.

BRIEF DESCRIPTION OF THE DRAWINGS

These and/or other aspects will become apparent and more readily appreciated from the following description of the embodiments, taken in conjunction with the accompanying drawings of which:

FIG. 3 is a table for describing the levels of security intensity stored in a storage according to an example.

FIG. 4 is a flowchart for describing a method of controlling a vehicle according to an exemplary embodiment of the present disclosure.

FIG. 10 is a flowchart showing a method of authentication performed when a door event occurs after authentication of a drivers seat is performed.

DETAILED DESCRIPTION

Figure 1:
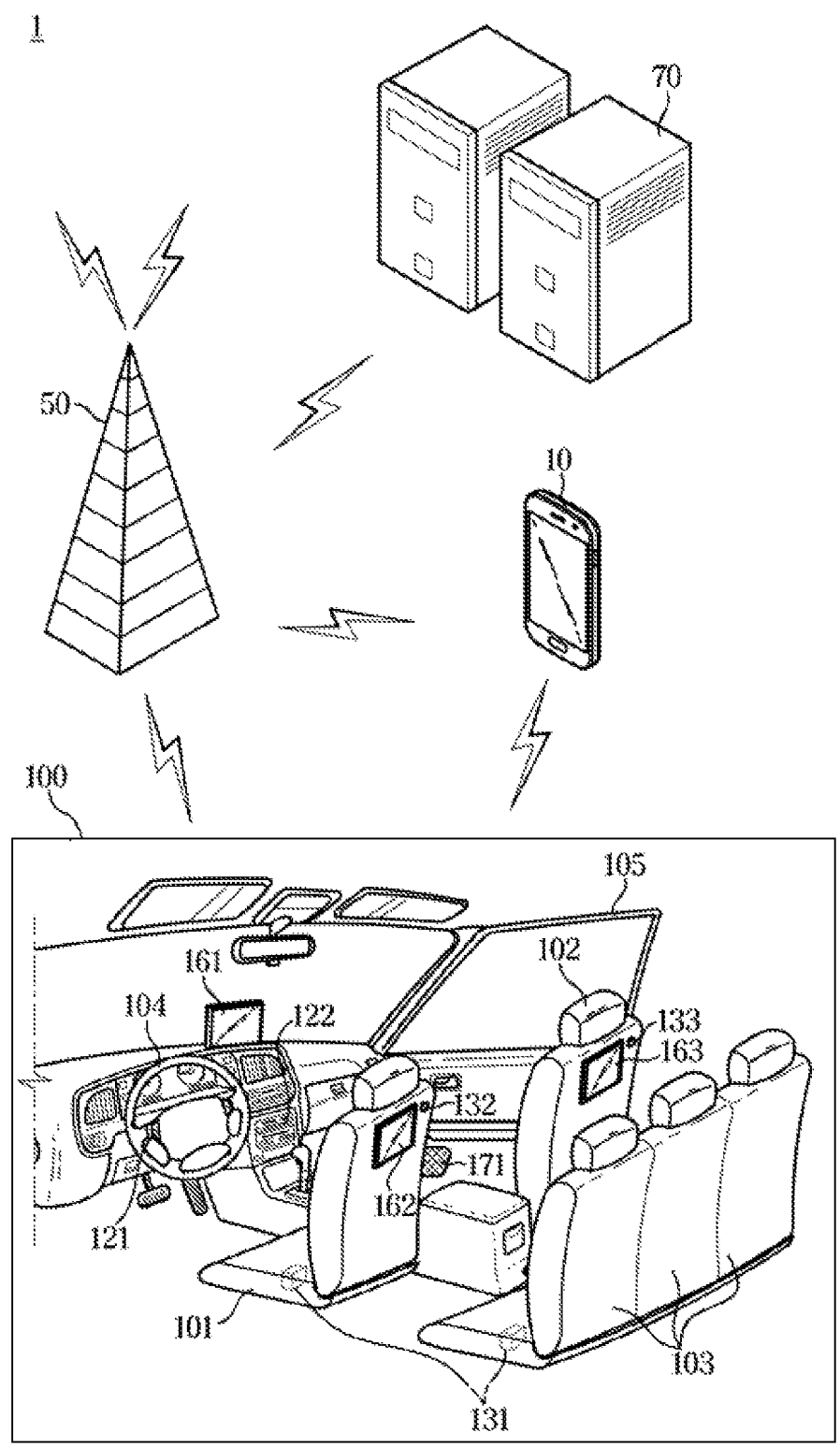
FIG. 1 is a system for describing a connected car service according to an exemplary embodiment of the present disclosure.

Like numerals refer to like elements throughout the specification. Not all elements of embodiments of the present disclosure will be described, and description of what are commonly known in the art or what overlap each other in the embodiments will be omitted. The terms as used throughout the specification, such as part", module", member", block", etc., may be implemented in software and/or hardware, and a plurality of parts", modules", members", or blocks" may be implemented in a single element, or a single part", module", member", or block" may include a plurality of elements.

It will be in addition understood that the term "connect" or its derivatives refer both to direct and indirect connection, and the indirect connection includes a connection over a wireless communication network.

It will be in addition understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the working principle and embodiments of the present disclosure will be described with reference to the accompanying drawings.

FIG. 1 is a system for describing a connected car service according to an exemplary embodiment of the present.

Referring to FIG. 1, a system 1 according to an exemplary embodiment of the present disclosure includes a vehicle 100, a user terminal 10 performing communication with the vehicle 100, a base station 50, and an authentication sever 70 configured to check a status of authentication with at least one of the vehicle 100, the user terminal 10, and the base station 50.

The user terminal 10 may be implemented as a computer or a portable terminal connectable with the vehicle 100 via a network. Here, the computer may include, for example, a notebook personal computer (PC), a desktop PC, a laptop PC, a tablet PC, a slate PC, and the like, on which a WEB Browser is installed. The portable terminal is a wireless communication device that ensures portability and mobility, including: all types of handheld-based wireless communication devices, such as personal communication system (PCS), global system for Mobile communications (GSM), personal digital cellular (PDC), personal handy phone system (PHS), a personal digital assistant (PDA), an international mobile telecommunication (IMT), a personal digital assistant (PDA)-2000, code division multiple access (CDMA)-2000, w-code division multiple access (W-CDMA), wireless broadband internet (WiBro) terminals, smart phones; and wearable devices, such as watches, rings, bracelets, ankle bracelets, necklaces, glasses, contact lenses, or head-mounted device (HMD).

The following embodiments are described in relation to an example in which a user carries a smartphone among the user terminals 10, and rides the vehicle 100, but the user terminal 10 according to the present disclosure is not limited thereto.

The base station 50 may simultaneously transmit and receive data to and from the vehicle 100 and various devices through a large-scale antenna system. In addition, the large-scale antenna system minimizes radio waves radiated in a direction other than a desired direction in which radio waves are transmitted, thereby reducing the noise while improving transmission quality and reducing the amount of electric power consumption.

The base station 50 may perform wireless communication with the vehicle 100 that travels at a constant speed or more. In detail, the vehicle 100 may perform communication with the base station 50 through a second generation (2G) communication system, such as time division multiple access (TDMA) and code division multiple access (CDMA), a third generation (3G) communication scheme, such as wide code division multiple access (WCDMA), code division multiple access (CDMA2000), wireless broadband (WIBRO) and world interoperability for microwave access (WiMAX), and a fourth generation (4G) communication schemes, such as long term evolution (LTE) and wireless broadband evolution. In addition, the vehicle 100 may perform wireless communication with the base station 50 by employing a fifth generation (5G) communication scheme. The 5G communication scheme transmits wireless signals that are modulated through a non-orthogonal multiplexing access (NOMA) scheme, different from the conventional technology in which transmission signals are modulated through an orthogonal frequency division multiplexing (OFDM) scheme.

The authentication server 70 may receive information about authentication of a user transmitted by the vehicle 100, and may confirm whether the authentication is completed. For example, when the authentication server 70 is a server related to financial settlement, the authentication server 70 may receive authentication completion information transmitted from the vehicle 100, and then transmit data related to the financial settlement to the vehicle 100.

The authentication server 70 may receive the information related to authentication from the vehicle 100 via the base station 50, but may perform authentication with the user through the user terminal 10. However, since the embodiment of the present disclosure relates to a connected car in which the user terminal 10 is connected to the vehicle 100, the following description will be made in relation that the user terminal 10 provides a connected car service, such as a settlement service, through the vehicle 100. That is, the vehicle 100 provides authentication execution, which is performable by the authentication server 70 through the user terminal 100, and performs the authentication by adjusting the degree of security intensity and type of the authentication performed on the basis of a status of occupancy of each seat and a running state of the vehicle 100.

The vehicle 100 includes displays 161, 162, and 163 displaying various interfaces that are provided by an AVN device provided in the vehicle 100 to the user, input devices 121 and 122 provided around a steering wheel 104 and seats 101, 102, and 103 to receive a manipulation command of the user, sensor devices 131, 132, and 133 determining information required for authentication, such as iris, fingerprint, and the like of the user, and whether the seat is occupied, and a speaker 171 providing the user with sound, warning sound, and reproduction sound.

Figure 2:
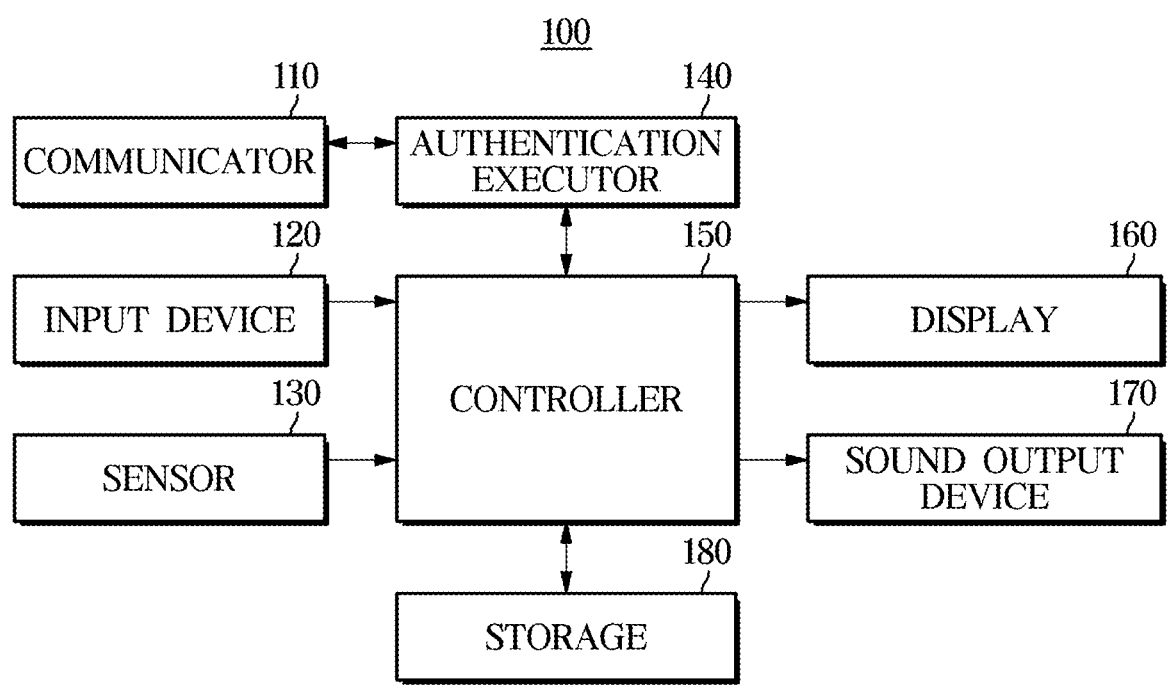
FIG. 2 is a control block diagram illustrating a vehicle according to an exemplary embodiment of the present disclosure.

In detail, the above-described components are each a hardware device provided inside the vehicle 100, and serves to implement operations performed by each component described in FIG. 2. For example, the main display 161 provided on a dashboard of the vehicle 100 provides users sitting on a driver's seat 101 and a passenger seat 102 with an interface for authentication and connected car services. In detail, the main display 161 is a device for converting an electrical signal received by the display 160 from the controller 150 into a visual signal and outputting the converted visual signal. Further, the main display 161 may provide an interface by emitting light through respective pixels of the main display 161. As another example, the speaker 171 provided on a door 105 of the vehicle 100 may output sound and guidance speech indicating that the authentication is completed through vibration.

In addition, the interior of the vehicle 100 may include various devices required for authentication of the user and connected car services.

FIG. 2 is a control block diagram illustrating a vehicle according to an exemplary embodiment.

Referring to FIG. 2, the vehicle 100 includes a communicator 110 for communicating with the user terminal 10 and the outside of the vehicle 100, an input device 120 for receiving an input command of a user, a sensor 130 for sensing whether a user sits on a seat, an authentication executing processor 140 for performing authentication together with the authentication server 70, a display 160 for visually outputting various interfaces, a sound output device 170 for audibly outputting an interface, a storage 180 for storing levels of security intensity and authentication methods, and a controller 150 for controlling the above-described components.

In detail, the communicator 110 performs communication with the user terminal 10, the base station 50, and the authentication server 70. The communicator 110 transmits a password received from the user for performing authentication with the authentication server 70 and related electrical signals to the authentication server 70. In addition, the communicator 110 receives a signal indicating that the authentication is completed from the authentication server 70, and transmits the signal to the authentication executing processor 140.

In addition, the communicator 110 may receive various signals including signals required for communication with other vehicles during running of the vehicle 100 and global positioning system (GPS) signals transmitted from satellites, and may transmit the signals to the outside.

The communicator 110 may include components required for performing the above-described operations. For example, the communicator 110 may include at least one of a short-range communication module, a wired communication module, and a wireless communication module.

The short-range communication module may include various types of short range communication modules that may transmit and receive signals using a wireless communication network in a near field, such as a Bluetooth module, an infrared communication module, a radio frequency identification (RFID) communication module, a wireless local access network (WLAN) communication module, a near field communication (NFC) communication module, and a zigbee communication module, The wired communication module may include not only various wired communication modules, such as a controller area network (CAN) communication module, a local area network (LAN) module, a wide area network (WAN) module, or a value added network (VAN) module, but also various cable communication modules, such as universal serial bus (USB), high definition multimedia interface (HDMI), digital visual interface (DVI), recommended standard 232 (RS-232), power line communication or plain old telephone service (POTS).

The wireless communication module may include not only a Wifi module, a wireless broadband (Wibro) module but also wireless communication modules that support various communication schemes, such as a global system for mobile communication (GSM), a code division multiple access (CDMA), a wideband code division multiple access (WCDMA), a universal mobile telecommunications system (UMTS), time division multiple access (TDMA), long term evolution (LTE), and the like.

The wireless communication module may include a wireless communication interface including an antenna and a transmitter for transmitting a wireless signal. In addition, the wireless communication module may further include a wireless signal conversion module for modulating a digital control signal output from the controller 150 through a wireless communication interface into an analog type wireless signal under the control of the controller.

The wireless communication module may include a wireless communication interface including an antenna and a receiver for receiving a wireless signal. In addition, the wireless communication module may further include a wireless signal conversion module for demodulating an analog type wireless signal received through the wireless communication interface into a digital control signal.

The input device 120 receives various input commands from the user.

For example, the input device 120 may receive a start command for bluetooth pairing with the user terminal 10 from a user who sits on a rear seat 103. In addition, the input device 120 may receive a password that needs to be input by the user for pairing.

In addition, the inputter 120 may receive various input commands required for controlling the vehicle 100.

The input device 120 may include hardware devices, such as various buttons or switches, a pedal, a keyboard, a mouse, a track-ball, various levers, a handle, and a stick, and may also include software devices, such as a Graphical User interface (GUI), such as a touch pad or the like. The touch pad is implemented as a touch screen panel (TSP), and may form a mutual layer structure with the display 160.

The sensor 130 is provided inside or outside the vehicle 100 to collect required information. For example, a weight detection sensor 131 provided in a seat senses the weight resulting from sitting of the user, and generates an electrical signal. In addition, a GPS, a gyro sensor, and an acceleration sensor generate various signals required for running of the vehicle 100.

The sensor 130 may include a camera, and convert an image generated by photographing the outside and inside of the vehicle 100 into an electrical signal.

The sensor 130 may include various sensors required for user authentication. In detail, the sensor 130 may be implemented as devices 132 and 133 provided adjacent a seat to recognize an iris and fingerprints of the user, or may be implemented as a device for distinguishing voice of the user.

The authentication executing processor 140 performs authentication required for executing a connected car service on the basis of signals transmitted from the input device 120 and the sensor 130. In detail, the authentication executing processor 140 performs authentication according to an authentication method required for a connected car service selected by a user. When the user performs the authentication, the authentication executing processor 140 provides a result of the authentication to the authentication server 70 through the communicator 110.

The authentication executing processor 140 performs various types of authentication according to a seat on which a user sits, a level of security intensity, and a connected car service.

For example, when the authentication executing processor 140 is connected to the user terminal 50 and performs a connected service related to an email search corresponding to a personal service, the authentication executing processor 140 may perform authentication having a level of security intensity higher than that of authentication for a service providing general weather forecast and news.

As another example, when a personal service identified as having the same level of security intensity is performed at the driver's seat 101, the authentication executing processor 140 may perform authentication having a higher level of security intensity depending on whether a passenger sits on the rear seat 103.

As another example, even when the same connected car service is performed on the same seat, the authentication executing processor 140 may perform authentication having a different level of security intensity depending on whether the user has performed authentication before riding the vehicle 100.

In addition to the above-described examples, the authentication executing processor 140 may perform other individual authentications according to the seats. For example, when a plurality of users are in the vehicle 100, the authentication executing processor 140 may perform multiple personal authentication, and may perform authentication including a different authentication method depending on the position of each seat and the type of a connected car service to be performed.

In the present disclosure, the authentication executing processor 140 may be a processor such as a central processing unit (CPU) carrying instructions of computer program. Although the authentication executing processor 140 is illustrated as being separated from the controller 150 which will be described below for the sake of convenience in description, the present disclosure is not limited thereto. That is, the authentication executing processor 140 may be configured integrally with the controller 150 and perform an authentication method according to a level of security intensity.

The display 160 may be implemented as a display for displaying visual information to the user, and the display 160 may include various type of hardware, not only a display, such as an instrument panel for providing speed information of the vehicle 100 and various vehicle conditions, but also a head up display (not shown) for displaying speed information and the like on a front shield provided in front of the driver's seat 101, a main display 161 for displaying visual information provided by the AVN device, and a rear seat display 162 provided on a rear side of the driver's seat 101 and the passenger seat 102 to provide a connected car service to a user sitting on the rear seat.

The display 160 may be implemented as a cathode ray tube (CRT), a digital light processing (DLP) panel, a plasma display panel (PDP) panel, a liquid crystal display (LCD) panel, an electro luminescence (EL) panel, an electrophoretic display (EPD) panel, an electrochromic display (ECD) panel, a light emitting diode (LED) panel, or an organic light emitting diode (OLED) panel, but the display 160 of the present disclosure is not limited thereto.

The sound output device 170 outputs various types of sound required for providing connected car services as well as warning sound warning the running state of the vehicle 100. For example, the sound output device 170 may output sound and a guidance message informing a user of information indicating whether the authentication executing processor 140 has completed authentication.

The sound output device 170 may be implemented as a plurality of loudspeakers to provide individual authentication methods and connected car services according to seats, and may output different types of sounds and speeches for the respective services, and may stop outputting sound currently being output and output a single unified sound under the control of the controller 150.

The controller 150 may include a memory (not shown) configured to store an algorithm for controlling the above described operation of each component of the vehicle 100 and data related to a program that reproduces the algorithm, and a processor (not shown) configured to the above described operation using the data stored in the memory. In this case, the memory and the processor may be implemented as separate chips. Alternatively, the memory and the processor may be implemented as a single chip.

The controller 150 may determine whether to perform authentication depending on the type of a connected car service selected by the user, and may distinguish a required authentication method depending on a seat in which the connected care service is performed. In addition, the controller 150 may determine the level of security intensity depending on a running status of the vehicle 100, a boarding status of an occupant, an authentication status indicating whether the user has performed authentication in advance, and a type of the connected car service, and controls the authentication executing processor 140 to perform authentication according to the determined level of security intensity. Detailed description of the control method of the controller 150 will be made later with reference to other drawings.

The storage 180 stores various pieces of information required for the above-described operation of the controller 150.

In detail, the storage 180 may temporarily store various pieces of data received by the components, such as the sensor 130 and the input device 120, as well as storing data output by the display 160 and the sound output device 170. In particular, the storage 180 stores a relationship between a classification of connected car services, a level of security intensity, and an authentication method, which will be described below with reference to FIG. 3, and provides data required for the controller 150 to determine the authentication method.

In addition, the storage 180 may temporarily or permanently store various pieces of data required for running of the vehicle 100, and there is no limitation on the type and size of data to be stored.

In the present disclosure, the storage 180 may be implemented as at least one of a nonvolatile memory device, such as a cache, a read only memory (ROM), a programmable ROM (PROM), an erasable programmable ROM (EPROM), an electrically erasable programmable ROM (EEPROM) and a flash memory, a volatile memory device, such as a random access memory (RAM), or a storage medium, such as a hard disk drive (HDD), a CD-ROM, and the like. However, the storage 180 according to the present disclosure is not limited thereto. The storage may be a memory implemented as a chip separated from the processor as described above with respect to the controller, or may be implemented as a single chip integrated with the processor.

In addition, the vehicle 100 may further include various other components than the components described above. For example, the vehicle 100 may include all components required for connected car services.

FIG. 3 is a table for describing the levels of security intensity stored by the storage according to an example.

The storage 180 may classify various connected car services as shown in FIG. 3, and may distinguish levels of security intensity and authentication methods according to the classification.

As an example, the connected car service may be divided into an account creation, a vehicle control, a first personalization service, a second personalization service, and a real-time information service.

The account creation corresponds to an authentication method used for initial authentication required to execute a connected car service, such as subscription to telematics services and vehicle registration. In detail, for the account creation, an authentication method requiring personal identification, such as an official certificate and an short message service (SMS) authentication is performed, and such an account creation may be classified as having a top level of security intensity.

The vehicle control corresponds to an authentication method required for a connected car service related to the vehicle 100. For example, the vehicle control may include a connected car service, such as running, remote control, fault diagnosis, automatic accident notification, and save our ship (SOS) service. Such connected car services as a vehicle control are associated with the safety of the user, and for this, an authentication method having a level of security intensity of "high", as in a personal account confirmation, may be performed. An authentication method performed in the personal account identification may include authentication methods, such as a password login, an email authentication, a biometric authentication, such as iris and fingerprint, a security code, and a one-time password (OTP).

A personalization service is a connected car service that includes personal privacy information. For example, the personalization service may include a first personalization service that includes an email login, a billing service, a valet mode, an internet of things (IOT) service, a location sharing service, and a personal account right setting, and a second personalization service that includes a change in radio channel setting, a latest destination inquiry, a speech recognition service, and a change in a bookmark performed by a user sitting in the vehicle 100.

Such a personalization service may be classified as having a level of security intensity lower than those of authentication required for the above-described personal account creation and the vehicle use, and the first personalization service may be set to have a level of security intensity of 'medium' higher than that of the second personalization service due to characteristics of the services.

In the embodiment, the level of security intensity of 'medium' may include an authentication method required for service use checking, and for this, authentication levels, such as personal identification number (PIN), pattern authentication, face recognition, voice speaker recognition, and bluetooth pairing, may be performed.

The second personalization service may be classified as having a level of security intensity of 'low', and when a status of seat occupancy is confirmed by checking whether doors of the vehicle 100 are opened or seats are occupied, it is determined that the authentication for the second personalization is completed. For the level of security intensity of "low", the authentication may be completed only by checking the position through the user terminal 10.

In the connected car services, real-time information services, such as announcement delivery, weather, news, and traffic information may be classified as having a level of security intensity of 'low' similar to the second personalization service.

The vehicle 100 classifies various connected car services and stores the levels of security intensity corresponding to the connected car services. Using the stored levels of security intensity, the vehicle 100 performs authentication according to the classification of an input connected car service according to the user's input command before executing the connected car service. The vehicle 100 executes the inputted connected car service only when the authentication is completed.

On the other hand, the classification of the connected car services, the levels of security intensity, and the authentication methods described above are merely an example, and it should be understood that various change may be possible.

FIG. 4 is a flowchart for describing a method of controlling a vehicle according to an exemplary embodiment.

Referring to FIG. 4, the vehicle 100 receives a request for a connected car service including position information of a seat (200).

In detail, the vehicle 100 receives a status of a seat occupancy detected by the sensor 130 provided in a plurality of seats together with the requested connected car service, different from the conventional connected car service.

The vehicle 100 determines the level of security intensity according to the position information of the seat and the classification of the connected car service (210).

As an example, the vehicle 100 may receive a connected car service classified as the first personalization service from the driver's seat 101. The vehicle 100 may determine an authentication method of the first personalization service to have a level of security intensity of 'medium' as previously set in the storage 180. However, as another example, when a plurality of users sit on the driver's seat 101 and the rear seat 103, the vehicle 100 may receive a connected car service classified as the first personalization service from the driver's seat 101. In this case, the vehicle 100 may change the level of security intensity from 'medium' to 'high' in order to protect the privacy of the user on the driver's seat 101.

That is, the vehicle 100 determines the level of security intensity and performs an authentication corresponding to the level of security intensity individually according to a plurality of seats occupied by users, thereby providing convenience of use and increasing the security.

After the level of security intensity is determined according to each seat, the vehicle 100 individually performs authentication with the user in the distinguished seat (220).

According to the conventional connected car service and authentication method, a selected connected car service is available for use by anyone in the vehicle 100 once authentication has been performed by a single system provided on a driver's seat. However, the vehicle 100 according to the disclosure may vary the authentication method of the connected car service according to distinguished seats, and perform different authentication methods even when the same connected car service is selected.

The vehicle 100 determines whether an authentication method according to the determined level of security intensity has been performed (230).

When the authentication is completed, the vehicle 100 executes the selected connected car service (240). However, when the authentication is not completed, the vehicle 100 does not execute the selected connected car service.

Figure 5:
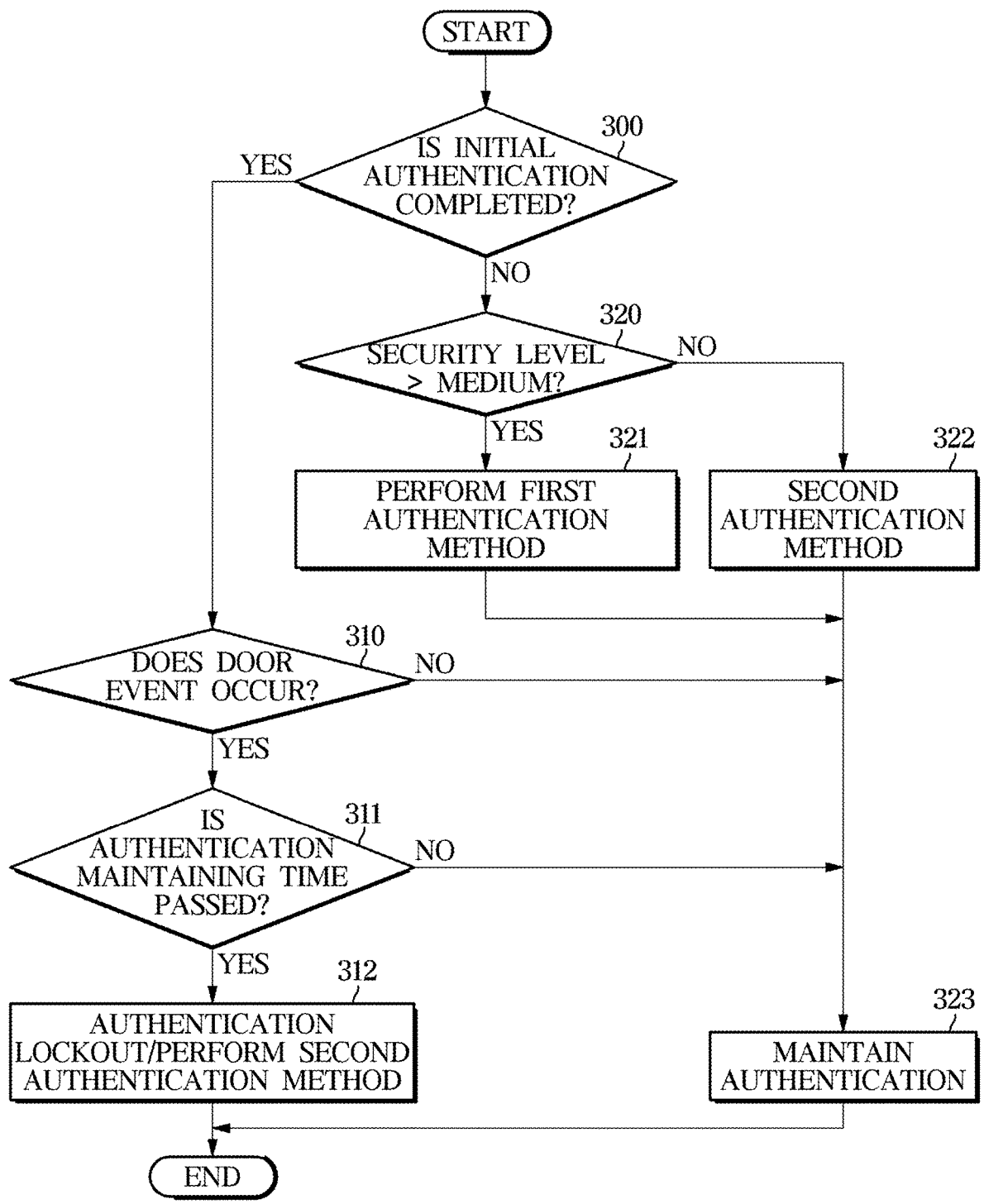
FIG. 5 is a flowchart showing a method of maintaining authentication according to an embodiment.

FIG. 5 is a flowchart showing a method of maintaining authentication according to an embodiment.

The vehicle 100 determines whether to maintain authentication or perform an authentication method having a low level of security intensity on the basis of whether the user has performed authentication before entering the vehicle 100 and on which seat the user is sitting.

Referring to FIG. 5, the vehicle 100 determines whether initial authentication has been performed (300).

Here, the initial authentication may represent an account creation having a level of security intensity 'top'.

When the initial authentication has already been performed, the vehicle 100 monitors whether a door event occurs (310).

Here, the door event refers to an event in which a door lock of the vehicle 100 is released and the user opens the door.

However, when the initial authentication has not been performed, the vehicle 100 determines the level of security intensity according to a connected car service inputted by the user after boarding the vehicle 100 (320).

In the case of a connected car service having a level of security intensity greater than or equal to 'medium', the vehicle 100 performs an authentication method with a high level of security intensity (hereinafter, referred to as a first authentication method) on the basis of an occupied seat as described above with reference to FIG. 4 (321). However, in the case of a connected car service having a level of security intensity less than 'medium', the vehicle 100 performs an authentication method with a low level of security intensity (hereinafter referred to as a second authentication method) on the basis of an occupied seat (322).

When the authentication is completed, the vehicle 100 maintains the authentication (executes the service) (323).

When a door event occurs after the first authentication is performed, the vehicle 100 checks a time elapsed until the door event occurs since the completion of the initial authentication (311).

When the time elapsed until the door event occurs since the completion of the initial authentication is within a predetermined maintaining time, the vehicle 100 does not perform additional authentication since the initial authentication has been completed (323).

However, when the time elapsed since the completion of the authentication passes the predetermined maintaining time, the vehicle 100 performs a second authentication method having a low level of security intensity (312).

The vehicle 100 has secured the identity of the user in advance through the initial authentication. Accordingly, when a connected car service is selected, only a simple authentication method may be performed, rather than performing an authentication method with a preset level of security intensity according to the selected connected car service, so that the convenience of the user may be improved.

Figure 6:
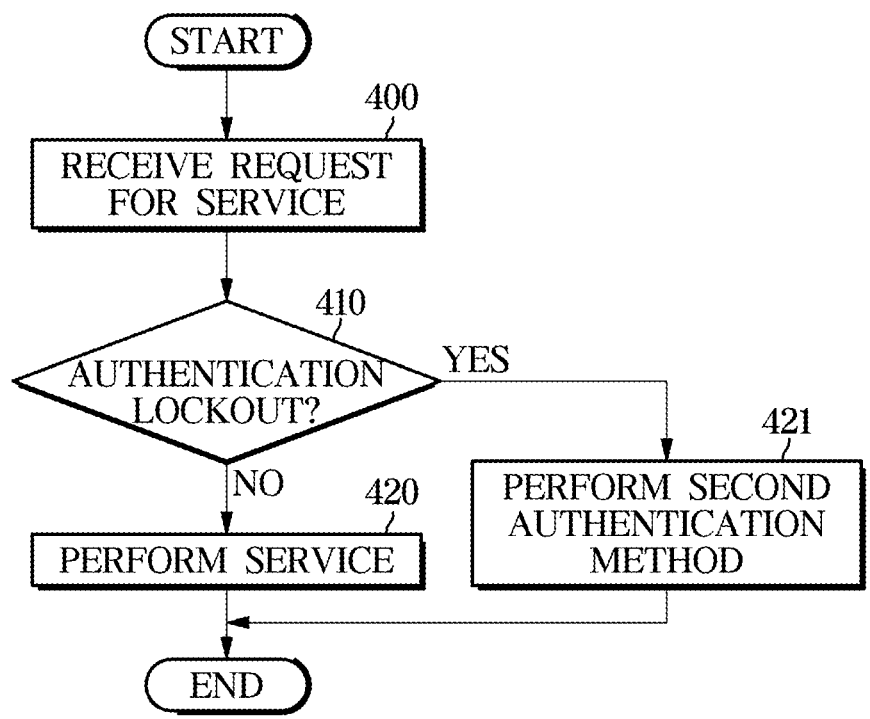
FIG. 6 is a flowchart showing an authentication lockout according to an exemplary embodiment of the present disclosure.

FIG. 6 is a flowchart showing an authentication lockout according to an embodiment.

Referring to FIG. 6, the vehicle 100 may receive a request for a connected car service during running (400).

The vehicle 100 determines whether an account of a user is locked (authentication lock) before determining the level of security intensity according to the position of the seat and the classification of the received connected car service (410).

An authentication lockout may occur when a predetermined maintaining time is passed after a door even occurs as described above with reference to FIG. 5. Alternatively, when a user uses a connected car service and logs out to an account of the service, the vehicle may enter an authentication lockout.

When the vehicle 100 is not in the authentication lockout state, the vehicle 100 immediately performs the service according to the request for use (420).

However, when the vehicle 100 is in the authentication lockout state, the vehicle 100 performs an authentication method (the second authentication method) with a level of security intensity lower than the determined level of security intensity (421).

The embodiment as shown in FIG. 6 illustrates a situation in which an authentication lockout occurs after authentication is performed. That is, since authentication has been already performed, the vehicle 100 performs an authentication method with a lower level of security intensity compared to the determined authentication method, to thereby improve the convenience of use.

Figure 7:
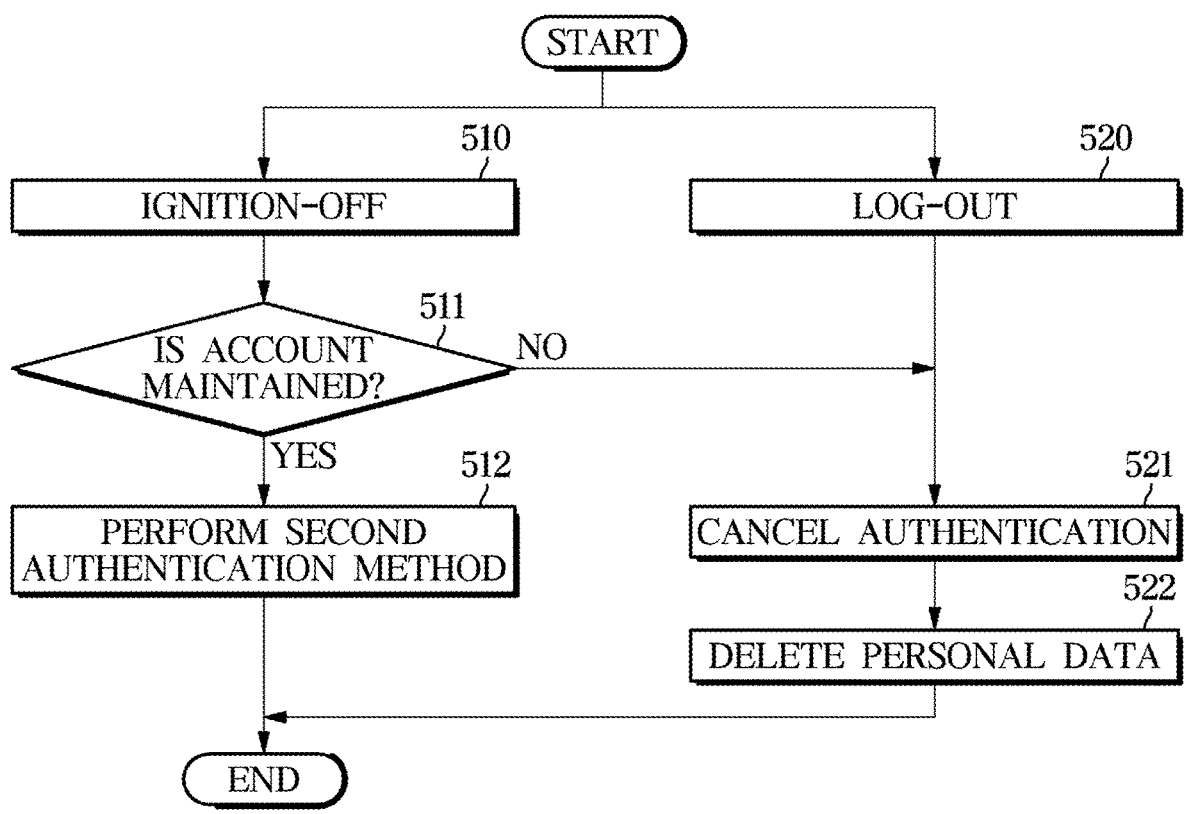
FIG. 7 is a flowchart showing a method of cancelling authentication according to an exemplary embodiment of the present disclosure.

FIG. 7 is a flowchart showing a method of canceling authentication according to an embodiment.

A situation in which authentication is cancelled according to an embodiment may be divided into a situation in which ignition of the vehicle 100 is turned off (510), or a situation in which a user account of a connected service being currently being executed is logged out (520).

When ignition is turned off, the vehicle determines whether an account of the currently executed connected car service needs to be maintained (511).

In other words, when ignition of the vehicle 100 is turned off, the vehicle 100 may allow the user to maintain the account of the currently executed connected car service and select the account at a time of next ignition of the vehicle 100.

When the user selects to proceed with the currently executed connected car service, the vehicle 100 performs a second authentication method with a level of security intensity lower than that of the currently executed connected car service at a time of next ignition-on (512).

In the case of the account not maintained, the vehicle 100 may cancel the authentication (521) and delete personal data stored during the execution (522).

Even when the user instructs a log-out, the vehicle 100 may cancel the authentication (521), and delete personal data stored during the execution (522).

Figure 8:
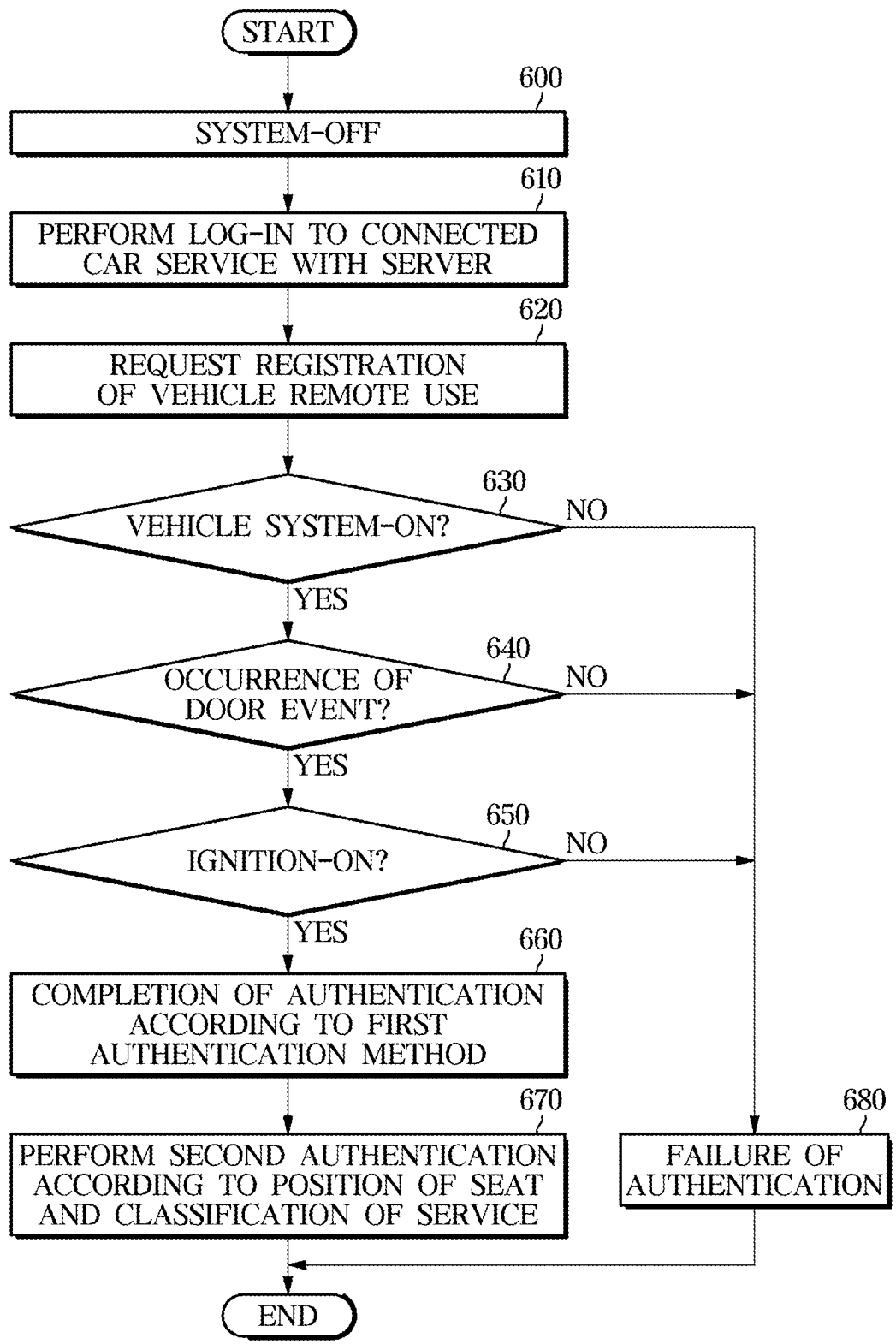
FIG. 8 is a flowchart showing an embodiment in which a user performs pre-authentication before riding a vehicle.

FIG. 8 is a flowchart showing an embodiment in which a user performs pre-authentication before riding a vehicle.

Referring to FIG. 8, the vehicle 100 is currently in a vehicle system-off state including an ignition-off state (600).

The user performs log-in to the authentication server 70 regarding a connected car service, by using a user terminal or the like (610).

In addition, the user requests registration of a vehicle remote use using the authentication server 70 (620).

The authentication server 70 periodically transmits account information of the connected car service, to which the user is logged in, to the vehicle 100.

When the vehicle 100 remains in the vehicle system-off state even after a predetermined period of time, an authentication failure is determined, and the vehicle 100 transmits an authentication failure to the authentication server 70 (680).

When the vehicle 100 is switched to a vehicle system-on state (630), the vehicle 100 monitors whether a door event occurs (640).

When a door event occurs, the vehicle 100 waits until ignition is turned on (650).

When the vehicle is a vehicle system-on state but a door event and an ignition-on are not performed until a predetermined time has reached, the vehicle 100 transmits authentication failure to the authentication server 70 (680).

However, when a door event and an ignition-on are performed until the predetermined time has reached, the vehicle 100 determines that authentication according to the first authentication method is completed (660).

Here, the authentication completion of the first authentication method has been performed according to log-in of the user through the user terminal 10 or the like before the user uses the vehicle 100. Accordingly, after the vehicle system is turned on, the vehicle 100 receives information about the completion of the authentication from the authentication server 70, and determines that the authentication required for the requested connected car service is completed when a door event and an ignition-on occur.

Then, when a request for re-use or the like is generated by a user, the vehicle 100 performs the second authentication according to the position of the seat and the classification of the service (670).

That is, the vehicle 100 may perform the remote authentication before the use of the vehicle 100 and may perform the second authentication method with a level of security intensity lower than that of the first authentication method when re-authentication is required, so that the convenience of use is improved.

Figure 9:
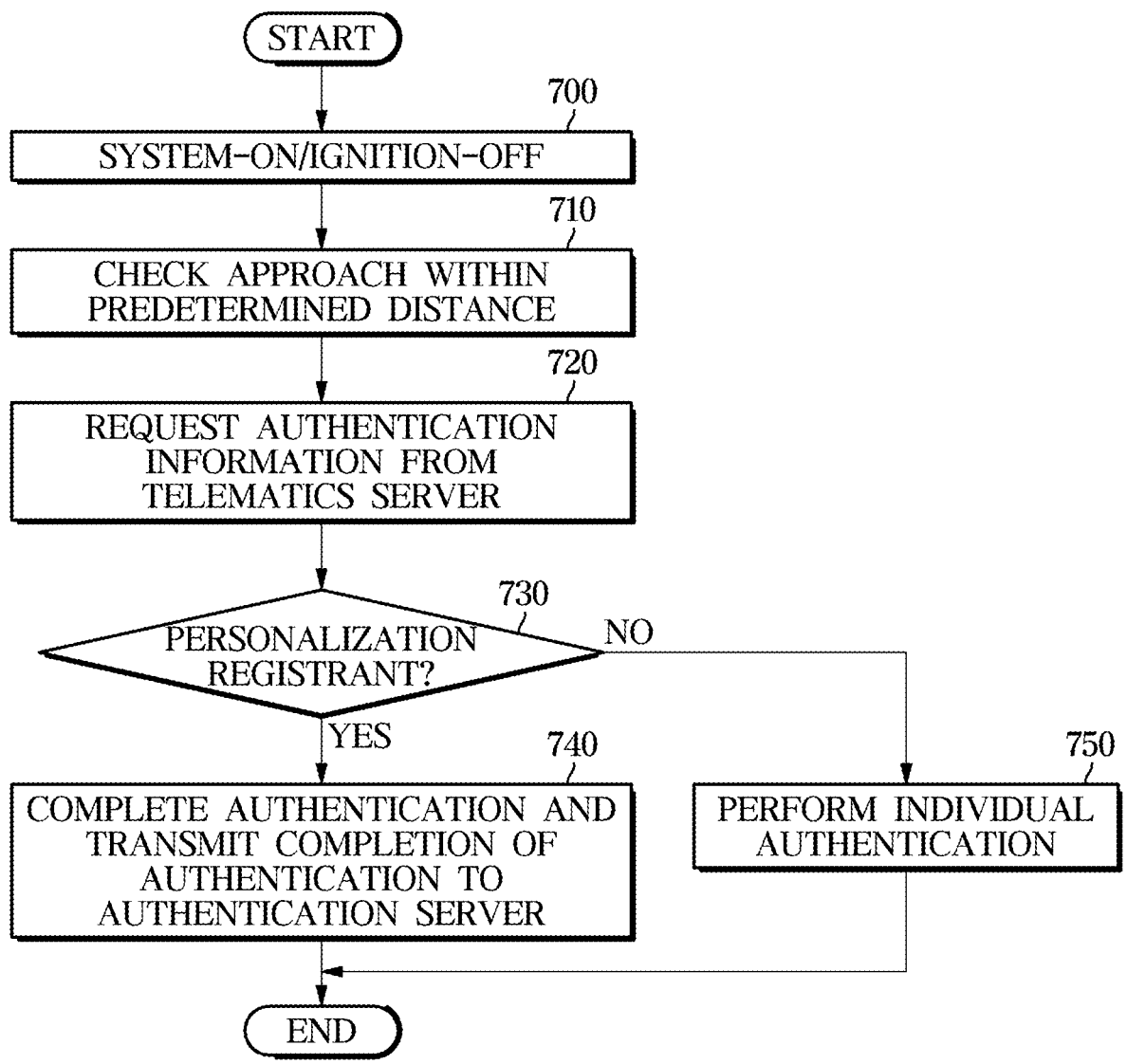
FIG. 9 is a flowchart showing an example that may occur when a user approaches a vehicle.

FIG. 9 is a flowchart showing an embodiment that may occur when a user approaches a vehicle.

Referring to FIG. 9, the user may turn on a vehicle system of the vehicle 100 and turn off ignition, outside a predetermined range of the vehicle 100 before riding the vehicle 100 (700).

Hereinafter, an embodiment will be described in relation that only the vehicle system is turned on and the ignition is turned off through a remote controller. However, the present disclosure is not limited thereto. That is, according to another embodiment, the user may turn on the system and turn on the ignition through a remote controller.

When the vehicle system is turned on, the vehicle 100 monitors whether the user approaches to be within a predetermined range of the vehicle 100 (710).

The predetermined range may be determined by various methods, for example, the sensor 130 may determine the position of the user through a laser or the like, or the communicator 110 may determine the position of the user by communicating with the remote controller and the user terminal 10.

When the user approaches the vehicle 100, the vehicle 100 requests authentication information from a telematics server (not shown) (720).

Different from the example in FIG. 8, the user has not performed authentication with the authentication server 70 in advance, and thus the vehicle 100 may first request the telematics server to check whether the authentication is completed.

The vehicle 100 may check whether the user is a personalization registrant through the telematics server (730).

Here, the personalization registrant is a type of telematics service, which refers to a user who has performed all authentications related to the vehicle 100 in advance. That is, the telematics server according to the embodiment may serve to perform authentication on the personalized registrant and the authentication server 70.

When the user is a personalization registrant, the vehicle 100 determines that the authentication is completed, and transmits a signal regarding the completion of authentication to the authentication server 70 (740).

When the user is not a personalization registrant, the vehicle 100 performs the individual authentication described above in FIG. 4 (750).

FIG. 10 is a flowchart showing an authentication method performed when a door event occurs after authentication in a driver's seat.

Referring to FIG. 10, the vehicle 100 is currently in a state with the driver sitting on the driver's seat 101 and the vehicle system turned on (800).

When a door event occurs in a seat rather than the driver's seat (810), the vehicle 100 performs an authentication method (the first authentication method) with a level of security intensity higher than that of an authentication method according to a selected connected car service (820).

Accordingly, the vehicle 100 may prevent personal information of the user who is sitting on the driver's seat from being exposed to a user who is sitting on the rear seat.

When the door event does not occur and at the same time, the driver requests a connected car service, the vehicle 100 performs authentication using an authentication method with a level of security intensity according to the type of the service and the driver's seat (840).

When the first authentication method has been performed but authentication of the driver fails, the vehicle 100 selects a level of security intensity on the basis of the position of the seat on which another user has sit after a door event and the type of the connected car service, and performs an authentication method according to the selected level of security intensity (840).

In addition, the vehicle 100 performs an individual authentication upon a request for a connected car service generated by a user sitting on a seat rather than the driver's seat.

Meanwhile, the embodiments described in FIGS. 5 to 10 are merely examples for describing various situations that may occur in the vehicle according to the present disclosure, and may further include other additional alternative embodiments.

Accordingly, the vehicle 100 may provide an authentication execution service on the basis of each seat of the vehicle 100, thereby adjusting the authentication intensity suitable for the use environment of the vehicle infotainment system and improving the convenience of use while appropriately maintaining the security intensity of user authentication.

As is apparent from the above, the vehicle and the method of controlling the same may adjust the authentication intensity suitable for a use environment of a vehicle infotainment system by providing an authentication execution service for each seat of the vehicle.

The vehicle and the method of controlling the same can improve easy of use while maintaining the security intensity of the user authentication.

What is claimed is:

1. A vehicle comprising:
a plurality of seats respectively provided at different positions inside the vehicle;
an authentication executing processor configured to perform authentication on each user seated on the plurality of seats;
a controller configured to provide a connected car service based on whether the authentication is completed,
wherein a type of the connected car service includes an account creation for using the connected car service, a vehicle control, a first personalization service including an email login, a billing service, a valet mode, an internet of things (TOT) service, a location sharing service, and a personal account right setting, a second personalization service including a change in radio channel setting, a latest destination inquiry, a speech recognition service, and a change in a bookmark performed by a user sitting in the vehicle, and a real-time information service for providing announcement delivery, weather, news, and traffic information; and
a storage configured to store a level of security intensity corresponding to the type of the connected car service, wherein the level of security intensity of the account creation is level 1, the level of security intensity of the vehicle control is level 2, the level of security intensity of the first personalization service is level 3, and the level of security intensity of the second personalization service and the level of security intensity of the real-time information service are level 4, wherein the level 1 is higher than the level 2, the level 2 is higher than the level 3, the level 3 is higher than the level 4,
wherein the controller controls the authentication executing processor to identify the type of the connected car service for each user and a position of a seat for each user, identify a level of security intensity corresponding to the type of the connected car service for each user, change the identified level of security intensity based on the position of the seat for each user, determine an authentication method for each user based on the changed level of security intensity for each user, and perform the authentication for each user based on the determined authentication method for each user,
the authentication method is different depending on the changed level of security intensity, and the authentication method includes one or more of a password login, an email authentication, an iris authentication, a fingerprint authentication, a security code, and a one-time password (OTP), a personal identification number (PIN), a pattern authentication, a face recognition, and a voice speaker recognition.

2. The vehicle of claim 1, wherein the controller checks whether a first authentication method according to a first level of security intensity has been performed, and performs a second authentication method which has a second level of security intensity lower than the first level of security intensity of the first authentication method based on completion of authentication according to the first authentication method.

3. The vehicle of claim 2, wherein the controller performs the second authentication method based on whether a door event has occurred, after the completion of the authentication of the first authentication method.

4. The vehicle of claim 3, wherein the controller performs an authentication lockout based on whether the user sits on a distinguished seat, after the occurrence of the door event.

5. The vehicle of claim 2, wherein the controller performs the second authentication method on the basis of an authentication maintaining time after the completion of the authentication of the first authentication method.

6. The vehicle of claim 2, wherein the controller determines whether to maintain an account on the basis of whether ignition-off is achieved after the completion of the authentication of the first authentication method, and performs the second authentication method on the basis of whether linking of the account is achieved.

7. The vehicle of claim 2, wherein the controller cancels the first authentication method on the basis whether log-out is achieved after the authentication according to the first authentication method is completed.

8. The vehicle of claim 2, wherein the controller receives information indicating a status of completion of the authentication according to the first authentication method from an authentication server, after a system-on command of the vehicle is received.

9. The vehicle of claim 8, wherein the controller performs the second authentication method upon receiving an additional request for a connected car service on the basis of whether a door event or an ignition-on is achieved.

10. The vehicle of claim 8, wherein the controller performs the second authentication method upon receiving an additional request for a connected car service on the basis of whether the user approaches to be within a predetermined range of the vehicle.

11. A method of controlling a vehicle including a plurality of seats respectively provided at different positions inside the vehicle, the method comprising steps of:

identifying a position of a seat for each user and a type of a connected car service for each user, wherein the type of the connected car service includes an account creation for using the connected car service, a vehicle control, a first personalization service including an email login, a billing service, a valet mode, an internet of things (TOT) service, a location sharing service, and a personal account right setting, a second personalization service including a change in radio channel setting, a latest destination inquiry, a speech recognition service, and a change in a bookmark performed by a user sitting in the vehicle, and a real-time information service for providing announcement delivery, weather, news, and traffic information, identifying a level of security intensity corresponding to the type of the connected car service for each user form information stored in a storage, changing the identified level of security intensity based on the position of the seat for each user, determining an authentication method for each user based on the changed level of security intensity for each user, performing an authentication for each user based on the determined authentication method for each user, and executing the connected car service for each user based on whether the authentication for each user is completed, wherein the authentication method is different depending on the changed level of security intensity, and wherein the authentication method includes one or more of a password login, an email authentication, an iris authentication, a fingerprint authentication, a security code, and a one-time password (OTP), a personal identification number (PIN), a pattern authentication, a face recognition, and a voice speaker recognition, wherein the information stored in the storage includes information about a level of security intensity of the account creation set to level 1, a level of security intensity of the vehicle control set to level 2, a level of security intensity of the first personalization service set to level 3, and a level of security intensity of the second personalization service and a level of security intensity of the real-time information service set to level 4, and wherein the level 1 is higher than the level 2, the level 2 is higher than the level 3, the level 3 is higher than the level 4.

12. The method of claim 11, wherein the step of performing the authentication includes:

checking whether a first authentication method according to a first level of security intensity has been performed; and performing a second authentication method which has a second level of security intensity lower than the first level of security intensity of the first authentication method on the basis of completion of the authentication according to the first authentication method.

13. The method of claim 12, wherein the step of performing the authentication includes performing the second authentication method on the basis of whether a door event has occurred after the completion of the authentication of the first authentication method.

14. The method of claim 12, wherein the step of performing the authentication includes an authentication lockout on the basis of whether the user sits on a distinguished seat, after the occurrence of the door event.

15. The method of claim 12, wherein the step of performing the authentication includes performing the second authentication method on the basis of an authentication maintaining time after the completion of the authentication of the first authentication method.

16. The method of claim 12, wherein the step of performing the authentication includes:

determining whether to maintain an account on the basis of whether ignition-off is achieved after the completion of the authentication of the first authentication method; and performing the second authentication method on the basis of whether linking of the account is achieved.

17. The method of claim 12, further comprising a step of canceling the first authentication method on the basis of whether log-out is achieved after the completion of the authentication of the first authentication method.

18. The method of claim 12, further comprising receives information indicating a status of completion of the authentication according to the first authentication method from an authentication server, after a system-on command of the vehicle is received.

* * * * *